US010860520B2

(12) United States Patent
Puri et al.

(10) Patent No.: US 10,860,520 B2
(45) Date of Patent: *Dec. 8, 2020

(54) INTEGRATION OF A VIRTUALIZED INPUT/OUTPUT DEVICE IN A COMPUTER SYSTEM

(71) Applicant: Oracle International Corporation, Redwood City, CA (US)

(72) Inventors: Rahoul Puri, Los Altos, CA (US); Rick C. Hetherington, Pleasanton, CA (US); Harry Stuimer, San Jose, CA (US); Hongping Li, San Jose, CA (US); John R. Feehrer, Westford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 14/944,767

(22) Filed: Nov. 18, 2015

(65) Prior Publication Data

US 2017/0139799 A1    May 18, 2017

(51) Int. Cl.
*G06F 13/42* (2006.01)

(52) U.S. Cl.
CPC ................. *G06F 13/4282* (2013.01)

(58) Field of Classification Search
CPC ............ G06F 11/3051; G06F 11/2289; G06F 11/3041; G06F 13/4282
See application file for complete search history.

(56) References Cited

U.S. PATENT DOCUMENTS

| 7,743,197 | B2 | 6/2010 | Chavan | |
|---|---|---|---|---|
| 7,752,360 | B2 | 7/2010 | Galles | |
| 8,464,260 | B2* | 6/2013 | Riley | G06F 9/468 |
| | | | | 710/313 |
| 8,984,221 | B2* | 3/2015 | Satoyama | G06F 3/0605 |
| | | | | 711/114 |
| 9,086,919 | B2 | 7/2015 | Iyer | |
| 9,928,207 | B1* | 3/2018 | Habusha | G06F 13/4282 |
| 10,521,365 | B2* | 12/2019 | Bshara | G06F 13/24 |
| 2003/0074599 | A1* | 4/2003 | Golasky | G06F 11/1662 |
| | | | | 714/6.2 |
| 2005/0198601 | A1* | 9/2005 | Kuang | G06F 17/5022 |
| | | | | 716/108 |

(Continued)

OTHER PUBLICATIONS

Abraham Silberschatz, et al, Operating System Concepts, Third Edition, book, Reprinted Sep. 1991, pp. 96-97, 601-602, Addison-Wesley Publishing Company, published U.S.

*Primary Examiner* — Tim T Vo
*Assistant Examiner* — Harry Z Wang
(74) *Attorney, Agent, or Firm* — Kowert, Hood, Munyon, Rankin & Goetzel, P.C.

(57) ABSTRACT

A system that allows access to a virtualized device is disclosed. The system may include a device, a processor, and a communication unit coupled to the device via a communication link. The device may include hardware resources configured to be shared by multiple threads executing on the processor. The communication unit may be configured to detect a request to access the device by the processor. In response to the detection of the request, the communication unit may send one or more instructions to the device via the communication link using a communication protocol.

16 Claims, 5 Drawing Sheets

(56) References Cited

U.S. PATENT DOCUMENTS

| | | | |
|---|---|---|---|
| 2006/0253619 A1 | 11/2006 | Torudbakken | |
| 2008/0256284 A1 | 10/2008 | Evoy | |
| 2010/0165874 A1* | 7/2010 | Brown | G06F 13/4022 370/254 |
| 2011/0107406 A1* | 5/2011 | Frost | G06F 9/45558 726/6 |
| 2013/0060940 A1* | 3/2013 | Koponen | H04L 12/4633 709/225 |
| 2013/0151750 A1* | 6/2013 | Kanigicherla | G06F 13/4022 710/313 |
| 2014/0281106 A1* | 9/2014 | Saghi | G06F 3/0664 710/313 |

* cited by examiner

INTEGRATION OF A VIRTUALIZED INPUT/OUTPUT DEVICE IN A COMPUTER SYSTEM

BACKGROUND

Technical Field

This invention relates to computing systems, and more particularly, to techniques for communication with devices included within such computing systems.

Description of the Related Art

Computing systems include multiple multi-threaded processors and devices, where each processor may send data to or receive data from a particular device. The devices may perform input/output (I/O) functions. For example, the devices may include ethernet network interface cards (NICs) that allow the processors to communicate with other computer systems, and other devices either internal or external to the computing system such as printers or storage devices, for example.

Hardware resources associated with a particular device may be shared between various threads being executed by one or more of the multi-threaded processors. During operation, a given thread may execute one or more software instructions that request access, either a read or write, to a particular hardware resource of a given device. The computing system may format and transmit the access request to the particular hardware resource via a packetized serial communication link.

To manage access requests from the various threads, a device may include dedicated hardware to perform control and data functions within the device. In some cases, the dedicated hardware may include an embedded processor, or other suitable general-purpose processor, configured execute multiple software instructions. In some computing systems, a device with shared hardware resources may be integrated into a System-on-a-Chip (SoC) along with one or more multi-threaded processors, for improved performance.

SUMMARY OF THE EMBODIMENTS

Various embodiments of an apparatus and method for accessing a virtualized device in a computing system are disclosed. Broadly speaking, a method and apparatus are contemplated in which a communication unit includes a first port which is coupled to a first device via a first link. The first device may include multiple hardware resources configured to be shared by multiple threads executed by a processor. The communication unit may be configured to detect a first request to access the first device by the processor. In response to the detection of the first request, the communication unit may send one or more first instructions to the first device via the first link using a first communication protocol.

In a non-limiting embodiment, the communication unit may include a second port which is coupled to a second device via a second link. In response to a detection of a second request by the processor to access the second device, the communication unit may send one or more second instructions to the second device via the second link using a second communication protocol.

In one implementation, the second communication protocol is different than the first communication protocol.

Figure 1:
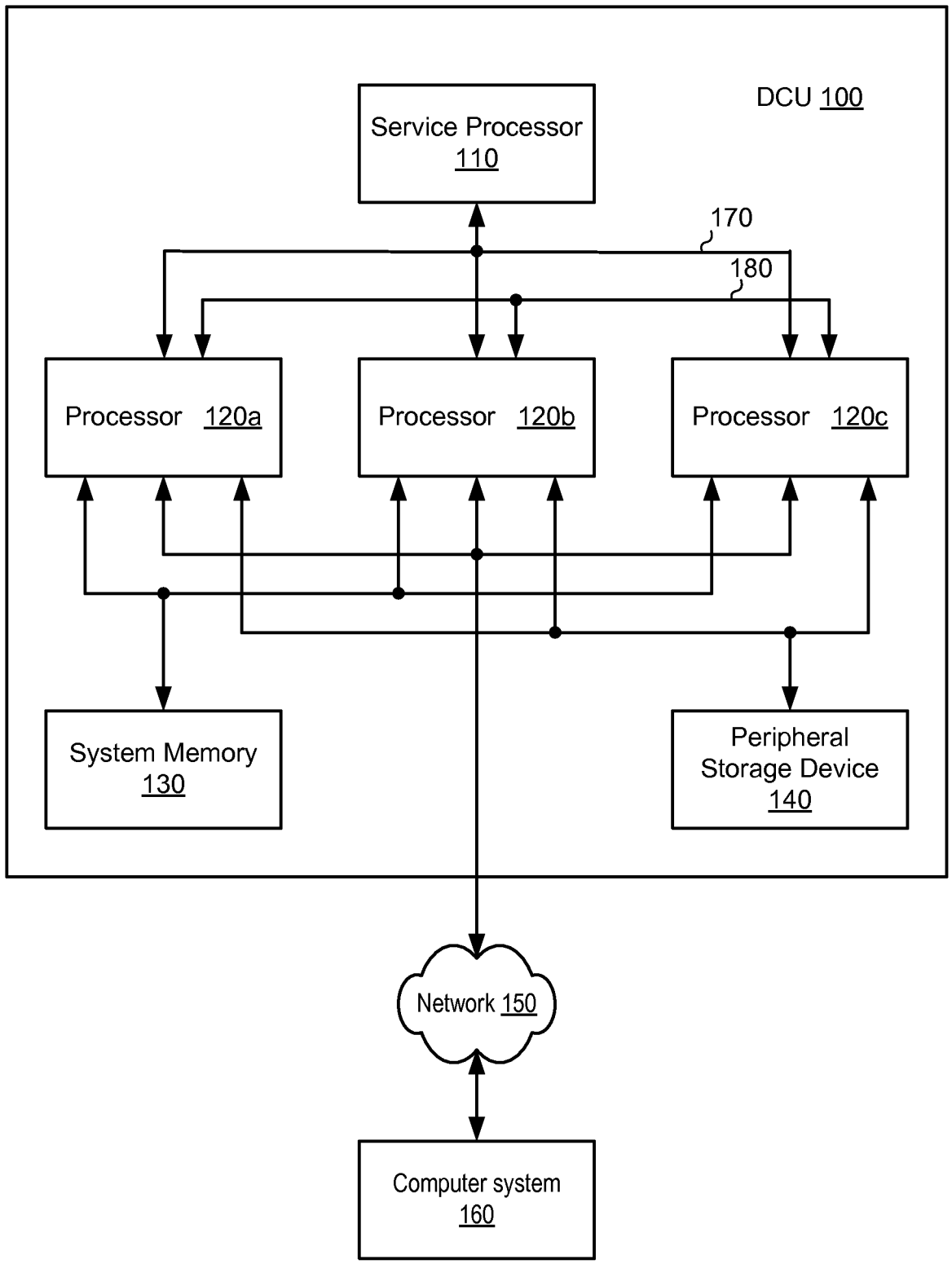
FIG. 1 is a block diagram of an embodiment of a distributed computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Multi-processor computing systems may support the use of one or more virtual machines, each running a respective Guest Operating System (GOS). Hardware resources, such as, e.g., an Input/Output (I/O) subsystem, may be shared between the various GOSs. During operation of such multi-processor computing systems, there may be many requests generated by software programs executing within the GOSs to transfer data to, or retrieve data from peripheral storage devices or other computing systems.

I/O subsystems may include multiple ports coupled to a common communication hub. For example, some systems may employ multiple PCI-Express Root Ports coupled to a common Root Complex. Each Root Port may handle data transfers with a device. In some cases, the hardware resources of the device may be shared by among different threads being executed by a processor or among multiple GOSs or threads. Each of the shared hardware resources appear as a dedicated resource to the different GOSs and threads sharing the hardware resources. A device whose hardware resources are shared in this manner is commonly referred to as a "virtualized device.".

Access to the hardware resources of a device between the various GOSs and threads are managed by control plane functions associated with the device. To implement such control functions, an embedded processor included in the device may execute firmware loaded into the device during initialization of the computing system. When a virtualized device is integrated into a System-on-a-chip (SoC), the embedded processor adds extra area, power consumption, and increases test complexity for the SoC. The embodiments illustrated in the drawings and described below may provide techniques for integrating a virtualized device into a SoC while minimizing the impact on area and power.

A block diagram illustrating one embodiment of a computing system 100 is shown in FIG. 1. In the illustrated embodiment, computing system 100 includes a service processor 110, coupled to a plurality of processors 120a-c through bus 170. It is noted that in some embodiments, service processor 110 may additionally be coupled to system memory 130 through bus 170, and may coordinate initialization and boot of processors 120a-c, such as from a power-on reset state. Processors 120a-c are, in turn, coupled to system memory 130, and peripheral storage device 140. Processors 120a-c are further coupled to each other through bus 180 (also referred to herein as "coherent interconnect 180"). Computing system 100 is coupled to a network 150, which is, in turn coupled to a computer system 160. In various embodiments, computing system 100 may be configured as a rack-mountable server system, a standalone system, or in any suitable form factor. In some embodiments, computing system 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed.

Storage device 140 may, in some embodiments, include magnetic, optical, or solid-state storage media such as hard drives, optical disks, non-volatile random-access memory devices, etc. In other embodiments, storage device 140 may include more complex storage devices such as disk arrays or storage area networks (SANs), which may be coupled to processors 120a-c via a standard Small Computer System Interface (SCSI), a Fiber Channel interface, a Firewire® (IEEE 1394) interface, or another suitable interface. Additionally, it is contemplated that in other embodiments, any other suitable peripheral devices may be coupled to processors 120a-c, such as multi-media devices, graphics/display devices, standard input/output devices, etc.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through coherent interconnect 180 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor.

Figure 2:
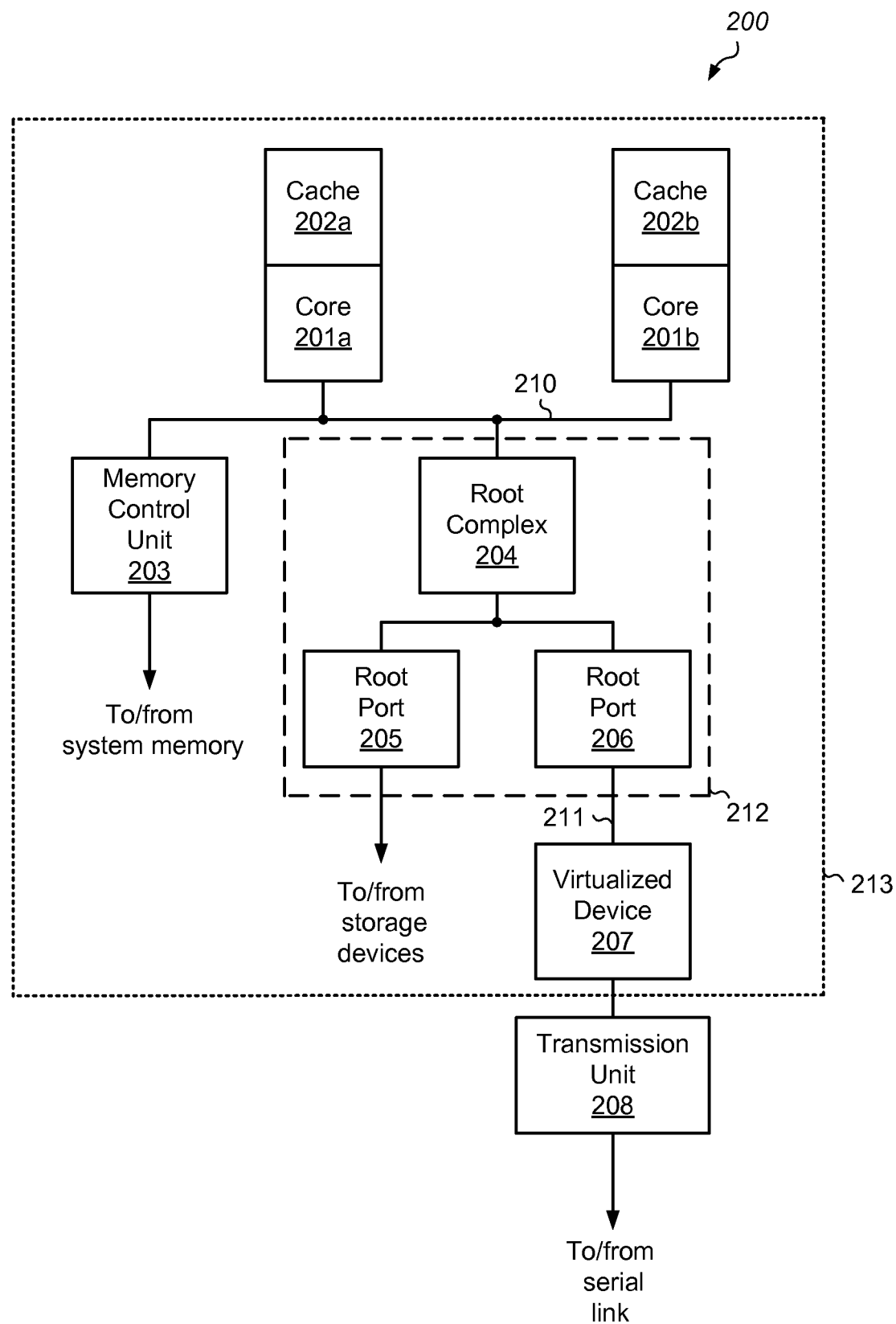
FIG. 2 is a block diagram of an embodiment of a processor.

A block diagram illustrating one embodiment of a SoC processor 200 is shown in FIG. 2. In some embodiments, processor 200 may correspond to processors 120a-c of DCU 100 in FIG. 1. In the illustrated embodiment, processor 200 includes processor cores 201a and 201b. It is noted that although two cores are shown, in various embodiments, any suitable number of processor cores may be employed. Each of cores 201a-b is coupled to a respective one of cache paritions 202a-b. Cores 201a-b are coupled to each other and to memory control unit 203, and communication unit 204 via on-chip network 210. On-chip network 210 may be a point-to-point network, ring-based network, or any other suitable network configuration that allows for communication between processor cores 201a-b, memory interface 203 and communication unit 212. In some embodiments, on-chip network 210 may include a multi-wire parallel bus, and requests and responses between the various devices may be transmitted via the multi-wire parallel bus using an suitable communication protocol.

Cores 201a-b may be configured to execute instructions and to process data according to a particular instruction set architecture (ISA). In one embodiment, cores 201a-b may be configured to implement the SPARC® V9 ISA, although in other embodiments it is contemplated that any desired ISA may be employed, such as x86, PowerPC® or MIPS®, for example. In the illustrated embodiment, each of cores 201a-b may be configured to operate independently of the others, such that all cores 201a-b may execute in parallel. Additionally, in some embodiments each of cores 201a-b may be configured to execute multiple execution threads (or simply "threads") concurrently, where a given thread may include a set of instructions that may execute independently of instructions from another thread. (For example, an individual software process, such as an application, may consist of one or more threads that may be scheduled for execution by an operating system.) A core capable of executing multiple execution threads may be referred to as a multithreaded (MT) core.

Cache memory partitions 202a-b may, in various embodiments, collectively form a level 3 (L3) cache memory for processor 200. The multiple cache memory partitions need to maintain coherency with respect to each other. Cache memory partitions 202a-h may, in various embodiments, implement one of numerous coherency protocols, such as, e.g., MOESI, MESI, or any suitable cache coherency protocol.

Each of cache memory partitions 202a-b may be configured to cache instructions and data for use by cores 201a-b. In the illustrated embodiment, each of cache memory partitions 202a-b may be separately addressable and independently accessed, may concurrently return data to a respective core of cores 201a-b. In some embodiments, each individual cache memory partition may be implemented using set-associative or direct-mapped techniques. For example, in one embodiment, each of cache memory partitions 202a-h may be a 8 megabyte (MB) cache, although other cache sizes and organizations are possible and contemplated Memory interface 203 may be configured to manage the transfer of data between cache partitions 202a-b and system memory in response to fill requests and data evictions. Memory interface 203 may be configured to interface to any suitable type of system memory, such as described above in reference to FIG. 1 In some embodiments, memory interface 203 may be configured to support interfacing to multiple different types of system memory.

Communication unit 212 includes a PCIe Root Complex 204 and Root Ports 205 and 206, and may be configured to transfer data between processor 200 and other peripheral devices. It is noted that although a single Root Complex and two Root Ports are shown in the present embodiment, other embodiments may include any suitable number of Root Complexes and Ports. PCIe Root Complex 204 may, in various embodiments, be configured to relay requests and responses (collectively "transactions") between processor 200 and devices coupled to Root Ports 205 and 206. Since transactions may be formatted differently on on-chip network 210 than what the aforementions devices are capable of receiving, PCIe Root Complex 204 may translate the transactions from the communication protocol of on-chip network 210 to a communication protocol compatible with a device coupled to one of Root Ports 205 and 206. The translation of a transaction may include the translation of addresses from the address space of processor 200 to a device address space, as well as the conversion of a multi-bit data words into data packets to be transmitted in a serial fashion. It is noted that in the present embodiment, communication unit 212 includes circuit blocks specific to the PCIe communication protocol as a particular example to aid in explanation. In other embodiments, any suitable communication protocol may be employed, such as, Peripheral Component Interface (PCI) and Accelerated Graphics Port (AGP), for example.

Each of Root Ports 205 and 206 may be configured to relay a translated transaction to a particular device in accordance with a particular communication protocol. In some embodiments, Root Port 205 may be configured to relay a translated transaction to a device. In various embodiments, Root Port 205 may transmit the translated transaction to the device using one of various communication protocols, such as the PCIe communication protocol, for example. Such transactions may be sent outside of integrated circuit chip 213.

Root port 206 is coupled to virtualized device 207 via virtual link 211. As described below in more detail, virtualized device 207 may include circuitry configured to perform multiple functions, each of which may be accessed by separate Guest Operation Systems (GOS) being executed by processor 200, thereby allowing the hardware resources of virtualized device 207 to be shared among multiple software resources. Transactions relayed to virtualized device 207 via virtual link 211 may be encoded in accordance with any suitable protocol. In various embodiments, virtualized device 207, along with cores 201a-b, cache partitions 202a-b, memory control unit 203, root complex 204, root ports 205 and 205, and virtualized device 207 may be fabricated on integrated circuit chip 213. In such cases, virtual link 211 may not be limited by pin count, and may employ a multi-bit (parallel) data bus for improved communication speed and reliability.

Virtualized device 207 is further coupled to transmission unit 208. In various embodiments, transmission unit 208 may implement one or more network adaptor functions allowing virtualized device 207 access to external device via a high-speed serial data link. For example, transmission unit 208 may implement ENet, InfiniBand, or other suitable communication protocol.

It is noted that the embodiment illustrated in FIG. 2 is merely an example. In other embodiments, different functional units, different numbers of cores, caches and functional units, and different configurations of cores, caches, and functional units are possible and contemplated.

As mentioned above, hardware resources of a virtualized device may be shared between different threads or GOSs. Each thread or GOS sharing the hardware resources of the virtualized device may accesses different "virtual" functions performed the hardware resources of the virtualized device. To perform the actual transfer of data into and out of the virtual device on behalf of the virtual function, the hardware resources of the virtualized device may implement multiple physical functions.

To manage the sharing of the hardware resources, additional circuitry may implement additional functions (commonly referred to as "conventional functions") that manage access to the hardware resources by allowing the reading and writing of control registers within the virtualized device. Tasks included in the conventional function may be isolated from the physical and virtual functions to that user code and device drivers that access the physical and virtual function as incapable of accessing the control tasks.

Figure 3:
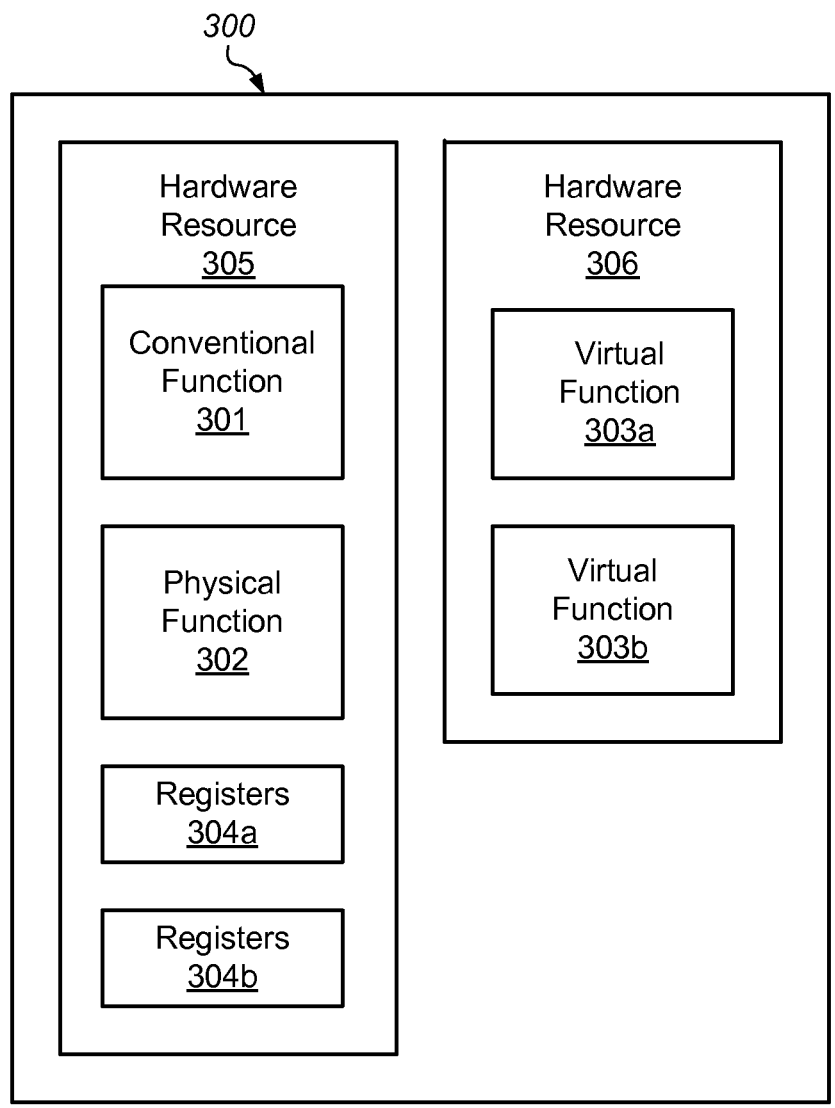
FIG. 3 illustrates a block diagram of an embodiment of a virtualized device.

An embodiment of a virtualized device that is configured to implement multiple virtual functions is illustrated in FIG. 3. In various embodiments, virtualized device 300 may correspond to virtualized device 207 as illustrated in FIG. 2. In the illustrated embodiment, virtualized device 300 includes hardware resources 305 and 306. Hardware resource 305 may be configured to implement conventional function 301, and physical function 302. Additionally, hardware resource 305 includes registers 304a and 304b. Hardware resource 306 may be configured to implement virtual functions 303a-b, each of which may be mapped to separate GOSs or threads. In some embodiments, values stored in registers 304a and 304b may affect the operation of virtual functions 303a and 303b, respectively.

Hardware resources 305 and 306 may be implemented according to one of various design styles. For example, hardware resources 305 and 306 may be implemented using a dedicated sequential logic circuit or state machine. Alternatively, a general-purpose processor configured to execute software instructions may be used to implement either of hardware resources 305 and 306. Although two hardware resource blocks are depicted in the embodiment illustrated in FIG. 3, it is noted that, in some embodiments, any suitable number of hardware resource blocks, include a single hardware resource block, may be employed in a virtualized device.

In order to implement the tasks included in conventional function 301, hardware resource 305 may include an interface that allows access to control plane management functions within virtualized device 300. Such control plane functions include, without limitation, connections to on-chip networks, communication with a fabric manager, I/O link configuration and training, communication channel establishment, performance monitoring and tuning, and general housekeeping functions. It is noted that, in some embodiments, hardware resource 305 may only include basic circuitry, such as, e.g., control status registers or CSRs (not shown), and that execution of commands associated with the control plane functions may be performed by a particular execution thread running on a processor or processor core, such as core 201a, for example.

By handling the control plane tasks of virtualized device 300 using an execution thread running on a processor core, the hardware resource 305 may be simplified. Alternatively, or additionally, all communication, i.e., both control and data plane communication, to virtualized device 300 may be performed inband using existing communication capabilities thereby reducing a need for separate communication busses among the blocks within an SoC. With reduced hardware and communication busses, pre-silicon verification and testing of the SoC may, in some embodiments, be simplified.

The execution of physical function 302 and virtual functions 303a-b, by hardware resources 305 and 306, collectively manage the transfer of data into and out of virtualized device 300 (commonly referred to as data plane functions). Such data plane functions may, in various embodiments, include management of user payload data stored in user-accessible queues, and encapsulation of such data into packets for transmission via an I/O link.

The data plane functions are accessed via software instructions running as part of an execution thread on a given processor or processor core. In various embodiments, the software instructions may be part of driver software (commonly referred to as a "device driver") for virtualized device 300. Physical function 302 and each of the virtual functions 303a-b may be mapped to a particular range of addresses with address space of a computing system. The address range claimed by a particular virtual function may be set in a corresponding register. For example, the address range claimed by virtual function 303a may be programmed into registers 304a (also referred to herein as a "Base Address Register" or "BAR") during initialization. The distinction between physical function 302 and virtual functions 303a-b is made because certain operations performed in the virtualized device, such as, e.g., reporting I/O link errors or managing transaction-processing resources shared by all virtual functions, are executed by a version of the driver that comprehends all of the virtual functions. This version of the driver may manipulate resources for these tasks through physical function 302.

When software needs access to a particular physical or virtual function, such as, e.g., virtual functions 303a-b, Programmed I/O (PIO) reads or write instructions may be issued via the executing thread. As described below in more detail, a software layer existing between the hardware a particular GOS instance may prevent unauthorized access to a particular function. Access to the CSRs may also be limited for security reasons.

It is noted that the embodiment illustrated in FIG. 3 is merely an example. In other embodiments, different numbers of virtual functions, and different control mechanisms may be employed.

Figure 4:
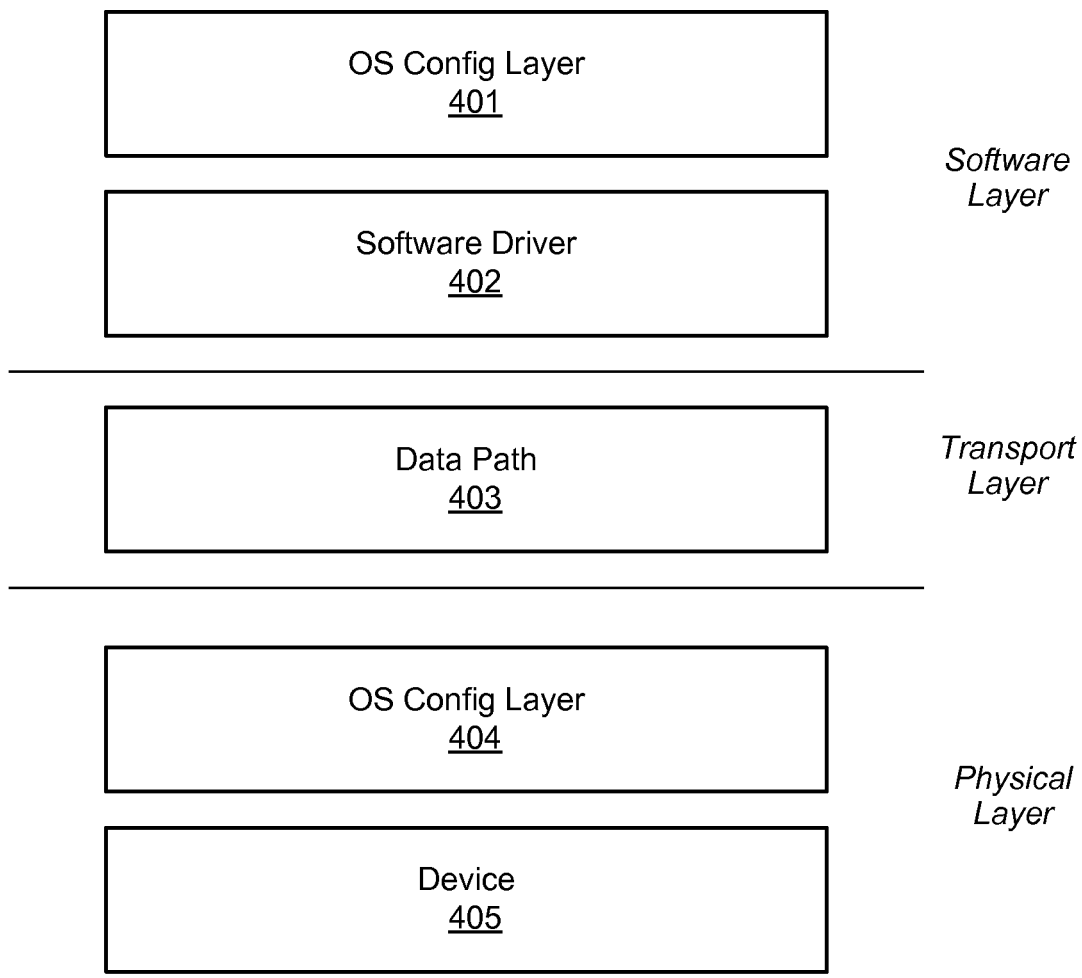
FIG. 4 illustrates a block diagram of an layered architecture of a communication protocol.

Turning to FIG. 4, a block diagram depicted a layered architecture of a communication protocol. In various embodiments, the layered architecture of FIG. 4 may correspond to an architecture of a communication protocol employed by computing system 200 for communication between one of processors 201a-h and virtualized device 207.

In the illustrated embodiment, the architecture includes a software layer, a transport layer, and a physical layer. The software layer may include operating system (OS) configuration layer 401 and software driver 402. In various embodiments, software driver 502 may include commands for sending to or receiving data from a device coupled to the computing system via a desired communication protocol. The OS configuration layer may support plug-and-play operations according to a specific communication protocol, such as, PCI or PCIe, for example. Program instructions intended to access a virtualized device, such as, e.g., virtualized device 207 as depicted in the embodiment illustrated in FIG. 2, may include calls to one or more functions include in OS configuration layer 401 and software driver 402.

In the present embodiment, the transport layer includes data path 403. In various embodiments, data path 403 may correspond to a virtual link such as, e.g, virtual link 211, for example. Data path 403 may allow for parallel transmission of data bits and allow for point-to-point communication between a given processor and a virtualized device. Since access requests to the virtualized device generated in the software layer are intended to be transmitted to the virtualized device via a packetized serial communication link, such as, e.g., PCIe, the access request may be translated or reformatted for transmission on the data path 403. Since data path 403 allows for point-to-point communication, the reformatted requests may not include packets associated with a data link layer and flow control credits that may be typically included as part of transactions intended for transmission via the packetized serial communication link.

The physical layer includes OS configuration layer 404 associated with device 405. Device 405 may correspond to virtualized device 207 as depicted in the embodiment illustrated in FIG. 2. In various embodiments, device 405 may communicate capabilities to one or more processors during a boot or initialization procedure. As used and described herein, capabilities refer to specific functionality visibility to the software layer. For example, in some embodiments, the capabilities may include functions, settings, and the like, that may be accessed by a PCIe software driver.

It is noted that the architecture illustrated in FIG. 4 is merely an example. In other embodiments, different layers and different components within the layers may be employed.

Figure 5:
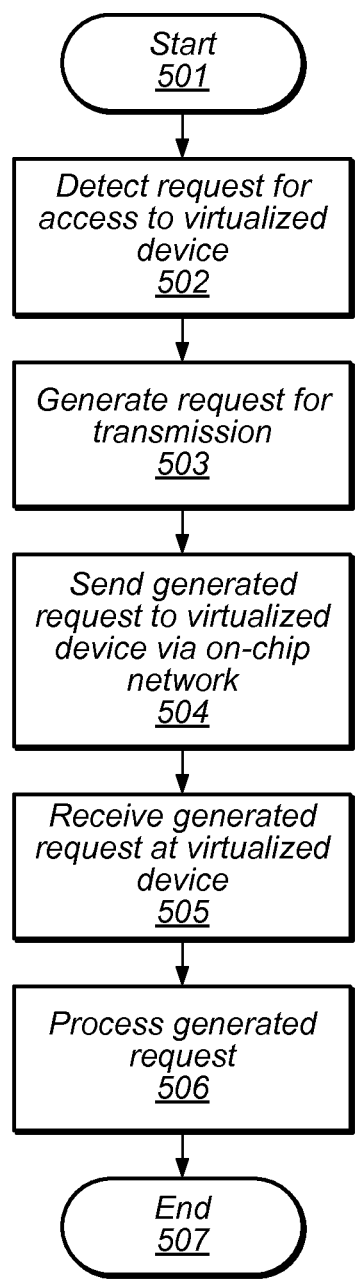
FIG. 5 illustrates a flow diagram depicting an embodiment of a method for allowing different levels of software to communicate with a virtualized device.

Turning to FIG. 5, a flow diagram depicting an embodiment of a method for software layers communicating with a virtualized device is illustrated. It is noted that the specific software layers depend on the implementation and method used for virtualizing the device to allow multiple instances of an operating system to utilize the device. Referring collectively to FIG. 2, FIG. 3, and the flow diagram of FIG. 5, the method begins in block 501. An initial request for an access to a device such as, e.g., virtualized device 207, may be detected (block 502). In various embodiments, a particular processor of cores 201a-b may execute instructions that cause the particular processor to request data be read from, or data to be written to, a device. In some cases, such requests are transmitted to Root Port 206 via an on-chip network, such as, e.g., on-chip network 210, for further transmission to the intended device. If, however, the intended device is to be access via a virtual link, such as, e.g., virtual link 211, the request may be processed as described below.

The request for access to the device may then be generated for transmission dependent upon the initial request (block 503). As described above, communication via an on-chip network may allow for point-to-point communication using a parallel data bus as opposed to a packetized serial communication link used in off-chip communication. As such, the request may be formatted to be compatible with virtual link 211 as opposed to a packetized serial format. In some embodiments, since virtual link 211 is more reliable that an external network connection, the generated request may not include information intended to improve communication reliability. For example, packets associated with a Data Link Layer and Cyclic Redundancy Checking (CRC) may not be employed. Also, off-chip communication may employ a serial communication protocol to conserve pin count and power, while on-chip communication may not be subject to such constraints, and may employ a parallel communication bus and associated protocol. In various embodiments, the request for virtualized device 207 may be formatted to advantageously use the parallel structure of virtual link 211.

The generated request may then be transmitted to the device (block 504). In various embodiments, the generated request may be transmitted by the particular processor of processors 201a-h via virtual link 211. The generated request may be transmitted in accordance with a particular communication protocol employed by virtual link 211. Virtualized device 207 may then receive generated request (block 505). In various embodiments, virtualized device 207 may monitor communication being transmitted via virtual link 211 and, upon noting that the intended recipient of a particular request is virtualized device 207, capture data associated with the request for further processing.

Virtualized device 207 may then process the generated request (block 506). In various embodiments, and dependent upon the nature of the request, virtualized device 207 may store data transmitted as part of the formatted request, and may respond the requestor with an acknowledgement message. Alternatively, virtualized device 207 may retrieve data from storage included within the device, and send the requested data back to requesting processor via virtual link 211 along with an acknowledgement message. Once the request has been processed by virtualized device 207 has been completed, the method may conclude in block 507.

Although the operations of the method illustrated in FIG. 5 are depicted as being performed in a sequential fashion, in other embodiments, one or more of the depicted operations may be performed in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a multi-threaded processor configured to execute a plurality of threads associated with a software application that includes a plurality of instructions, wherein a given one of the plurality of threads includes instructions of the plurality of instructions that are executable independently of other instructions of the plurality of instructions in other ones of the plurality of threads;
a first device including at least one hardware resource, wherein the first device is configured to the at least one hardware resource among the plurality of threads executed by the multi-threaded processor, wherein access to the at least one hardware resource is controlled by a first thread of the plurality of threads and one or more data plane functions of the first device are controlled by a second thread of the plurality of threads; and
a communication circuit coupled to the multi-threaded processor on a common integrated circuit chip, wherein the communication circuit includes a first circuit coupled to the first device via a virtual link, wherein the first circuit is configured to:
detect a first request to access the first device generated by the multi-threaded processor, wherein the first request is formatted with an on-chip communication protocol that includes a software layer, a transport layer, and a physical layer;
translate the first request from the on-chip communication protocol to a different communication protocol compatible with the first device; and
relay the first request to the first device via the virtual link using the different communication protocol.

2. The system of claim 1, further including a second device, and wherein the communication circuit includes a second circuit coupled to the second device via a second serial link, wherein the second circuit is configured to send one or more second instructions to the second device via the second serial link using a particular communication protocol in response to a detection of a second request to access the second device generated by the multi-threaded processor.

3. The system of claim 2, wherein the particular communication protocol is different than the different communication protocol.

4. The system of claim 2, wherein the different communication protocol includes parallel data transmission.

5. The system of claim 2, wherein the particular communication protocol includes a Peripheral Component Interface Express (PCIe) protocol.

6. A method, comprising:
generating, by a processor circuit, a first request to access a first device, wherein the first request is formatted with an on-chip communication protocol that includes a software layer, a transport layer, and a physical layer;
translating, by a communication circuit, the first request from the on-chip communication protocol to a different communication protocol compatible with the first device, wherein the communication circuit is coupled to the processor circuit on a common integrated circuit chip, and wherein the communication circuit is further coupled to the first device via a virtual link;
wherein the first device includes one or more hardware resources, and wherein the first device is configured to share the one or more hardware resources between different threads of a plurality of threads executed by a processor;
controlling one or more data plane functions of the first device by a second thread of the plurality of threads;
relaying, by the communication circuit, the first request to the first device via the virtual link using the different communication protocol; and
receiving the first request by the first device.

7. The method of claim 6, further comprising:
detecting, by the communication circuit, a second request to access a second device, wherein the communication circuit is coupled to the second device via a second serial link; and
transmitting, by the communication circuit, one or more second instructions to the second device via the second serial link using a second communication protocol in response to detecting the second request.

8. The method of claim 6, further comprising communicating, by the first device, one or more capabilities to the processor during an initialization procedure.

9. The method of claim 7, wherein the second communication protocol includes serial data transmission.

10. The method of claim 7, wherein the second communication protocol includes a Peripheral Component Interface Express (PCIe) protocol.

11. A system, comprising:
a plurality of processors, wherein a first processor of the plurality of processors is configured to execute a plurality of threads, wherein a first set of threads of the plurality of threads are associated with a first guest operating system, and wherein a second set of threads the plurality of threads is associated with a second guest operating system;

a first device including one or more hardware resources, wherein the first device is configured to share the one or more hardware resources between the first and second guest operating systems, wherein access to at least one of the one or more hardware resources is controlled by a first thread of the first set of threads, and wherein one or more data plane functions of the first device are controlled by a second thread of the second set of threads; and a communication circuit coupled to the plurality of processors on a common integrated circuit chip, wherein the communication circuit includes a first circuit coupled to the first device via a virtual link, wherein the first circuit is configured to:

detect a first request to access the first device generated by the processor, wherein the first request is formatted with an on-chip communication protocol that includes a software layer, a transport layer, and a physical layer;

translate the first request from the on-chip communication protocol to a different communication protocol compatible with the first device; and relay the first request to the first device via the virtual link using the different communication protocol in response to a detection of the first request.

12. The system of claim 11, wherein the first device is configured to communicate one or more capabilities to at least one processor of the plurality of processors during an initialization procedure.

13. The system of claim 11, further including a second device, and wherein the communication circuit includes a second circuit coupled to the second device via a second serial link, wherein the second circuit is configured to send one or more second instructions to the second device via the second serial link using a particular communication protocol in response to a different detection of a second request to access the second device generated by a second processor of the plurality of processors.

14. The system of claim 13, wherein the different communication protocol includes parallel data transmission.

15. The system of claim 13, wherein the particular communication protocol includes serial data transmission.

16. The system of claim 13, wherein the particular communication protocol includes a Peripheral Component Interface Express (PCIe) protocol.

* * * * *